(12) United States Patent
Holmberg et al.

(10) Patent No.: US 8,620,128 B2
(45) Date of Patent: Dec. 31, 2013

(54) SYSTEM AND METHOD FOR ANCHORING FIBER OPTIC CABLES TO PROVIDE STRAIN RELIEF

(75) Inventors: Matthew Holmberg, Le Center, MN (US); Paula Rudenick, Eden Prairie, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 29 days.

(21) Appl. No.: 13/282,004

(22) Filed: Oct. 26, 2011

(65) Prior Publication Data

US 2012/0177334 A1 Jul. 12, 2012

Related U.S. Application Data

(60) Provisional application No. 61/406,830, filed on Oct. 26, 2010.

(51) Int. Cl.
*G02B 6/44* (2006.01)
*G02B 6/00* (2006.01)

(52) U.S. Cl.
USPC .......................................... 385/135; 385/147

(58) Field of Classification Search
USPC .......................................... 385/100–109, 147
See application file for complete search history.

(56) References Cited

U.S. PATENT DOCUMENTS

| | | | |
|---|---|---|---|
| 3,614,298 A * | 10/1971 | Thompson et al. | 174/92 |
| 3,798,349 A * | 3/1974 | Thompson et al. | 174/92 |
| 4,795,230 A * | 1/1989 | Garcia et al. | 385/134 |
| 5,030,136 A | 7/1991 | Reinhardt et al. | |
| 5,397,859 A | 3/1995 | Robertson et al. | |
| 6,983,095 B2 | 1/2006 | Reagan et al. | |
| 7,369,741 B2 | 5/2008 | Reagan et al. | |
| 7,603,018 B2 | 10/2009 | Mullaney et al. | |
| 7,720,343 B2 | 5/2010 | Barth et al. | |
| 7,758,256 B2 * | 7/2010 | Hopkins et al. | 385/78 |
| 7,925,135 B2 * | 4/2011 | Mullaney et al. | 385/135 |
| 7,970,249 B2 | 6/2011 | Solheid et al. | |
| 8,032,001 B2 * | 10/2011 | Mullaney et al. | 385/135 |
| 2004/0086254 A1 | 5/2004 | Vastmans et al. | |
| 2008/0285933 A1 | 11/2008 | Vogel et al. | |
| 2010/0092147 A1 | 4/2010 | Desard et al. | |
| 2011/0026894 A1 | 2/2011 | Rudenick et al. | |

FOREIGN PATENT DOCUMENTS

JP 2007-114437 5/2007

OTHER PUBLICATIONS

International Search Report and Written Opinion mailed May 22, 2012.

* cited by examiner

*Primary Examiner* — Akm Enayet Ullah
(74) *Attorney, Agent, or Firm* — Merchant & Gould P.C.

(57) ABSTRACT

A cable anchoring assembly includes a jacket anchoring block having a jacket clamping location and a reinforcing structure anchoring block mounted to the jacket anchoring block. The reinforcing structure anchoring block includes a reinforcing structure anchoring location that defines a fastener opening and an access slot that extends outwardly from the fastener opening. The access slot has a first open end positioned at the fastener opening and a second open end offset from the fastener opening. The access slot provides an open lateral passage into the fastener opening. A fastener is adapted for engagement in the fastener opening.

20 Claims, 10 Drawing Sheets

SYSTEM AND METHOD FOR ANCHORING FIBER OPTIC CABLES TO PROVIDE STRAIN RELIEF

CROSS REFERENCE TO RELATED APPLICATION

The present application claims the benefit of U.S. Provisional Patent Application Ser. No. 61/406,830, filed Oct. 26, 2010, which application is hereby incorporated by reference in its entirety.

TECHNICAL FIELD

The present disclosure relates generally to fiber optic communication systems. More particularly, the present disclosure relates to systems and methods for anchoring fiber optic communication cables to enclosures or other structures.

BACKGROUND

Fiber optic communications technology is becoming more prevalent in part because service providers want to deliver high band with communication capabilities to customers. A typical fiber optic communication system includes a network of fiber optic cables. The fiber optic communications systems can also include additional components, such as fiber distribution hubs that house optical splitters for splitting optical signals, and drop terminals that provide interconnect locations for facilitating connecting subscribers to the fiber optic network. Other components typically found in fiber optic communication systems include pedestals, splice enclosures, network interface devices, optical network terminals and other structures.

A typical fiber optic cable includes at least one optical fiber adapted for transmitting optical signals. The optical fiber is typically enclosed within a protective outer jacket. The optical fiber can also be protected within a buffer tube located inside the protective jacket. Fiber optic cables typically also include reinforcing structures positioned inside the jacket. For example, flexible reinforcing structures such as aramid yarn (i.e., Kevlar) can be used to provide tensile reinforcement to the jacket that prevents tension from being applied to the optical fibers when a tensile load is applied to the fiber optic cable. Because tensile reinforcing structures such as aramid yarn are flexible, such structures provide minimal resistance to compressive forces applied to the fiber optic cables and do not provide meaningful resistance to cable buckling. Fiber optic cables can also be provided with reinforcing members that provide reinforcement for both tensile and compressive loading. For example, some fiber optic cables are provided with reinforcing rods formed of a material such as fiberglass reinforced epoxy. Such reinforcing structures are relatively stiff and are adapted to provide the fiber optic cables with reinforcement with respect to both tensile and compressive loading.

In a typical fiber optic communication system, fiber optic cables are routed into structures such enclosures. Within the enclosures, the outer jackets of the fiber optic cables are often stripped away to provide ready access to the optical fibers to allow for splicing and/or connectorization of the fibers. In such applications, the reinforcing structures of the fiber optic cables are typically anchored to the enclosure so that loadings applied to the fiber optic cables outside the enclosure are transferred from the reinforcing structures to the enclosure. In this way, such loadings are not transferred to the unjacketed portions of the optical fibers that are positioned within the enclosure.

Anchoring reinforcing structures to fiber optic enclosures or other structures (e.g., panels, shelves, drawers, frames, racks, etc.) can be a time consuming process. Improvements are needed in this area.

SUMMARY

An aspect of the present disclosure relates generally to systems and methods that facilitate anchoring reinforcing structures of fiber optic cables to components such as enclosures, panels, frames, racks, drawers, cabinets or other structures.

Another aspect of the present disclosure relates to a cable anchoring assembly including a jacket anchoring block having a jacket clamping location and a reinforcing structure anchoring block mounted to the jacket anchoring block. The reinforcing structure anchoring block includes a reinforcing structure anchoring location that defines a fastener opening and an access slot that extends outwardly from the fastener opening. The access slot has a first open end positioned at the fastener opening and a second open end offset from the fastener opening. The access slot provides an open lateral passage into the fastener opening. A fastener is adapted for engagement in the fastener opening.

Another aspect of the present disclosure relates to a fiber optic enclosure. The fiber optic enclosure includes a main housing body defining an interior region, a cable anchoring assembly secured to the main body housing, and a first fiber optic cable routed into the interior region of the main housing body. The cable anchoring assembly includes a jacket anchoring block having a jacket clamping location and a reinforcing structure anchoring block mounted to the jacket anchoring block. The reinforcing structure anchoring block includes a reinforcing structure anchoring location that defines a fastener opening and an access slot that extends outwardly from the fastener opening. The access slot has a first open end positioned at the fastener opening and a second open end offset from the fastener opening. The access slot provides an open lateral passage into the fastener opening. A fastener is adapted for engagement in the fastener opening. The first fiber optic cable includes an optical fiber, a reinforcing structure that extends a length of the first fiber optic cable and an outer jacket that surrounds the optical fiber. The outer jacket of the first fiber optic cable is secured to the jacket anchoring block and the reinforcing structure is secured to the reinforcing structure anchoring block.

Another aspect of the present disclosure is related to a method for securing a fiber optic cable to a fiber optic enclosure. The method includes removing a portion of an outer jacket from an end of a fiber optic cable so that a reinforcing structure of the fiber optic cable and an optical fiber of the fiber optic cable are exposed. The end of the fiber optic cable is routed through a channel of a jacket anchoring block of a cable anchoring assembly that is disposed in an interior region of a fiber optic enclosure. The outer jacket of the fiber optic cable is secured to the jacket anchoring block. The reinforcing structure is routed laterally through an access slot in a reinforcing structure anchoring block and into a fastener opening in the reinforcing structure anchor block. The reinforcing structure of the fiber optic cable is secured to the reinforcing structure anchor block by engaging a fastener in the fastener opening.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
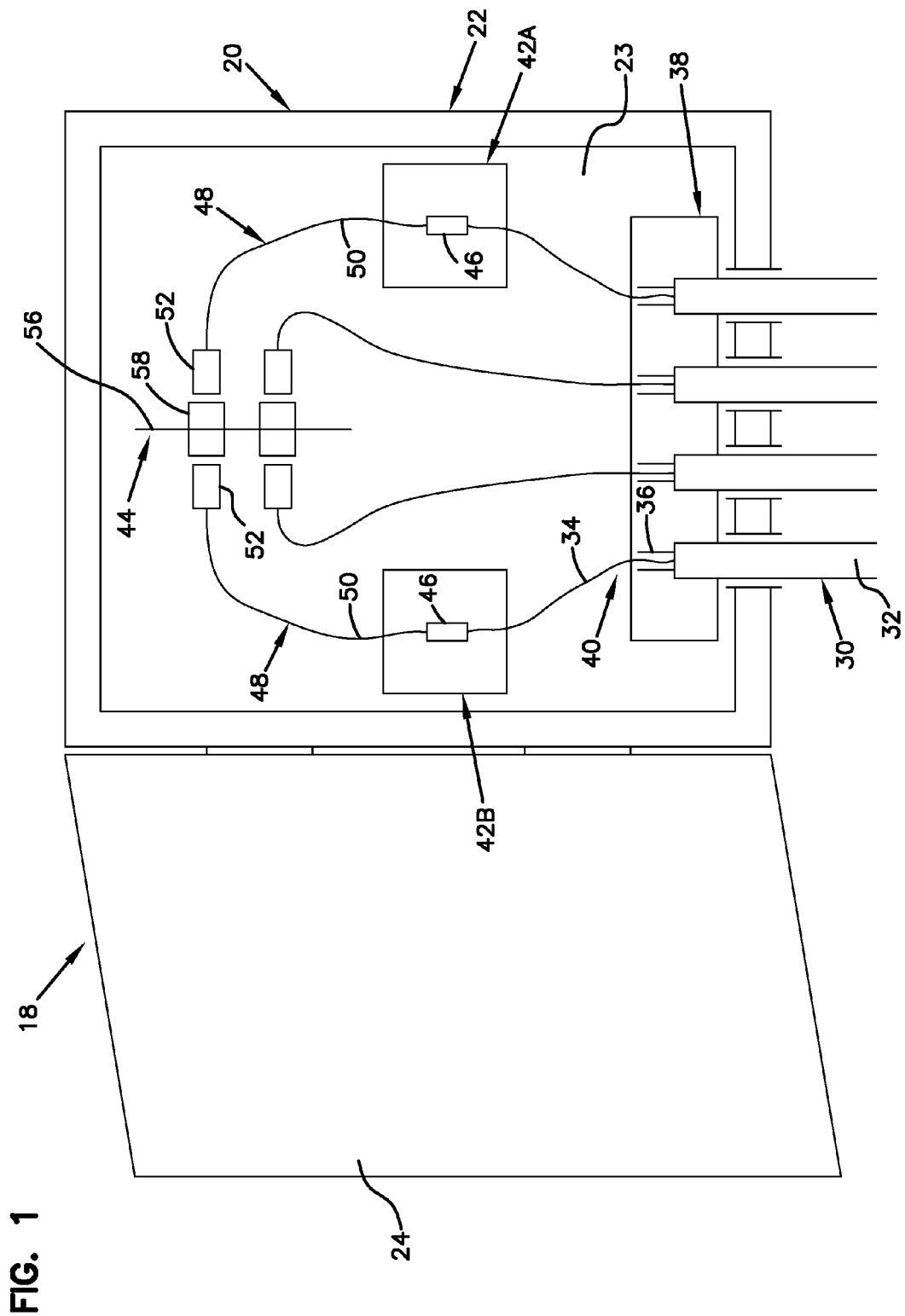
FIG. 1 is a schematic view showing an enclosure in accordance with the principles of the present disclosure for a fiber optic communication system.

FIG. 1 schematically depicts a piece of telecommunications equipment 18 including a fiber optic enclosure 20 (e.g., a cabinet). The fiber optic enclosure 20 includes a main housing body 22 defining an interior region 23, and an access door 24 for allowing the interior region 23 of the main housing body 22 to be readily accessed. In one embodiment, the door 24 is pivotably moveable between an open position where the interior region 23 of the main housing body 22 can be readily accessed, and a closed position where the interior region 23 of the main housing body 22 is sealed with respect to the outside environment.

Referring still to FIG. 1, a plurality of fiber optic cables 30 are shown routed into the fiber optic enclosure 20. Each of the fiber optic cables 30 includes an outermost jacket 32, at least one optical fiber 34 and a reinforcing structure 36 that runs the length of the fiber optic cable 30 and is positioned at least partially inside the outermost jacket 32. In the depicted embodiment of FIG. 1, each fiber optic cable 30 is shown as having only one optical fiber 34. It will be understood, however, that any of the fiber optic cables 30 could include multiple optical fibers.

The outermost jacket 32 surrounds and protects the optical fiber 34. The outermost jackets 32 and the reinforcing structures 36 are anchored to a cable anchoring assembly 38 secured (e.g., fastened, adhesively affixed, integrally molded, or otherwise affixed) to the fiber optic enclosure 20.

Referring still to FIG. 1, the outermost jackets 32 have been stripped from interior portions 40 of the fiber optic cables 30. Also, the reinforcing structures 36 have been trimmed with respect to the interior portions 40. Therefore, interior portions 40 are shown as including only the optical fibers 34. However, in certain embodiments, the optical fibers 34 of the interior portions 40 can be enclosed within a protective structure such as a furcation tube or other type of tubing.

The interior portions 40 of the fiber optic cables 30 can be routed to various structures within the fiber optic enclosure 20. For example, the piece of telecommunications equipment 18 is shown including splice regions 42A, 42B and a termination region 44. These splice regions 42A, 42B can include a plurality of splice trays supporting a plurality of splice sleeves 46 protecting locations at which the interior portions 40 of the fiber optic cables 30 are spliced (i.e., fusion spliced) to other fibers. For example, as shown at FIG. 1, the interior portions 40 are shown spliced to connectorized pigtails 48 each including a length of optical fiber 50 terminated by an optical connector 52.

The termination region 44 of the piece of telecommunications equipment 18 can include a panel 56 to which a plurality of fiber optic adapters 58 are mounted. The fiber optic adapters 58 are figured to mechanically interconnect two fiber optic connectors 52 in optical alignment with one another such that an optical transmission path is formed between the two fiber optic connectors 52 received within the fiber optic adapter 58.

In other embodiments, the interior portions 40 of the fiber optic cables 30 can be directly terminated with a fiber optic connector 52 without using an intermediate splice. It will be appreciated that selected ones of the connectors 52 can be interconnected by the fiber optic adapters 58 at the termination region 44.

Figure 2:
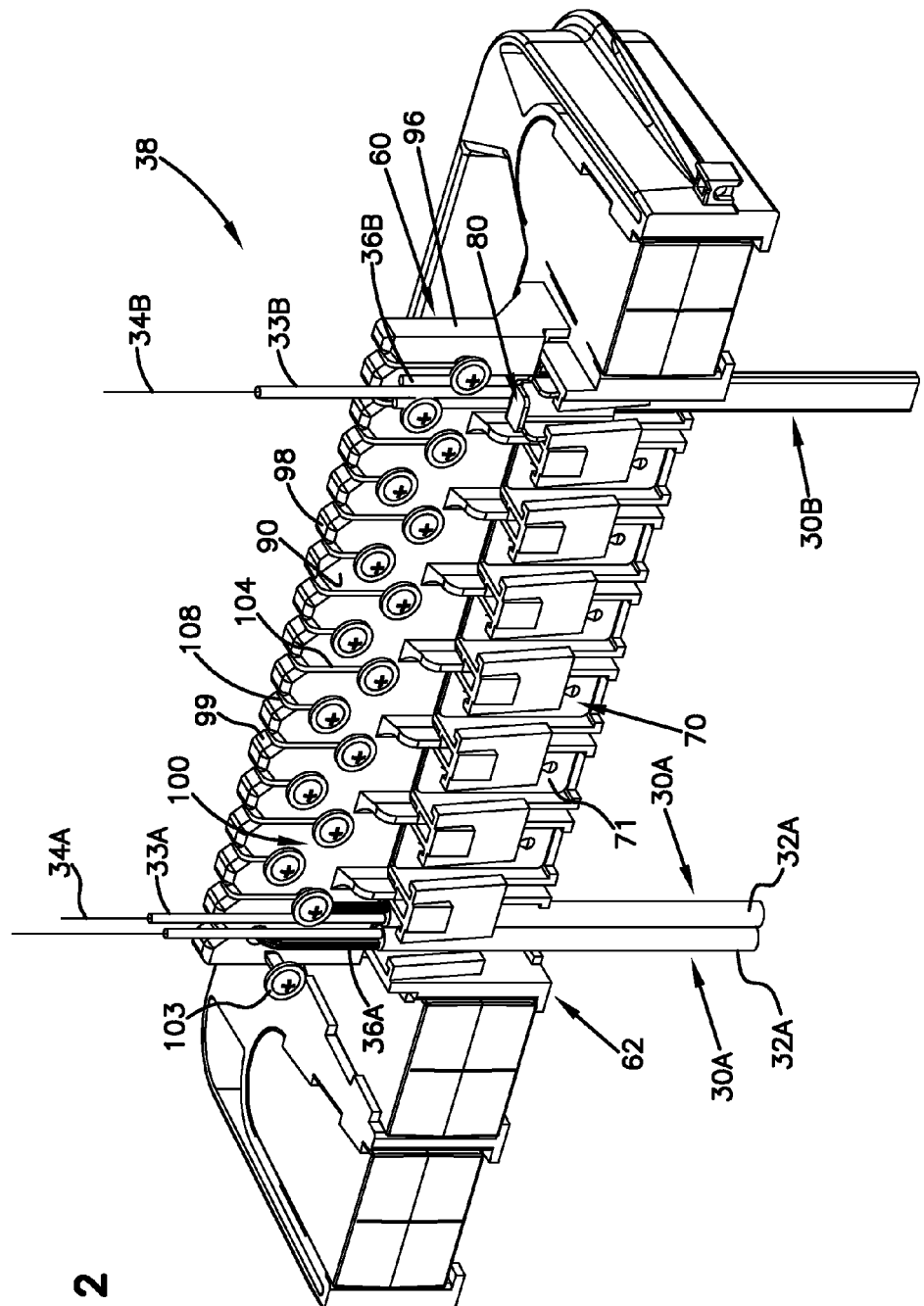
FIG. 2 is a front, top perspective view of a fiber optic cable anchoring arrangement in accordance with the principles of the present disclosure.

Referring now to FIGS. 2-6, an example cable anchoring assembly 38 suitable for use at the fiber optic enclosure 20 is shown. The cable anchoring assembly 38 includes a reinforcing structure anchoring block 60 mounted to a jacket anchoring block 62. As shown at FIG. 2, two different styles of fiber optic cable 30 are shown anchored to the cable anchoring assembly 38. For example, fiber optic cables 30A are shown including optical fibers 34A contained within a round jacket 32A. Optional buffer tubes 33A are shown over portions of the optical fibers 34A. The fiber optic cables 30A also include reinforcing structures 36A in the form of flexible strength members 36A (e.g., aramid yarn) that run through the lengths of the fiber optic cables 30A. The flexible strength members 36A provide tensile reinforcement to the fiber optic cables 30A, but do not provide meaningful resistance to buckling. The fiber optic cable 30B includes an optical fiber 34B contained within an outermost jacket 32B having an elongated transverse cross-section. An optional buffer tube 33B is shown over a portion of the optical fiber 34B. The outermost jacket 32B includes elongated, generally flat sides interconnected by rounded ends. The fiber optic cable 30B also includes reinforcing structures 36B in the form of reinforcing rods (e.g., fiberglass reinforced epoxy) that are relatively stiff as compared to the flexible strength members 36A. Such reinforcing rods are adapted to provide the fiber optic cable 30B with tensile reinforcement and anti-buckling characteristics.

The jacket anchoring block 62 of the cable anchoring assembly 38 defines a plurality of jacket clamping locations 70. Each jacket clamping location 70 includes a channel 72 through which a portion of a cable with the jacket thereon can be routed. The clamping locations 70 include ramp structures corresponding to each of the channels 72.

Referring now to FIGS. 2, 5 and 7-10, the clamping locations 70 can include ramp surfaces 75 defined by slots 76. The slots 76 include ramp surfaces 75 that angle toward beds 71 of the channels 72 as the ramp surfaces 75 extend in a downward direction. The clamping locations 70 work in concert with wedges 80 that are forced downwardly into the channels 72 to clamp the jackets 32 of the cables 30 within the channels 72. The wedges 80 include opposing flanges 81, 82 that fit within the slots 76. The flanges 81, 82 have angled end surfaces 83 that define angles that match the angles of the slots 76. The wedges 80 have clamping surfaces 84 that extend between the flanges 81, 82. By placing a cable in the channel 72 and then pushing one of the wedges 80 downwardly into the channel 72, the jacket of the fiber optic cable is clamped between the clamping surface 84 of the wedge 80 and the bed 71 of the channel 72 through the wedge action provided by the interaction of the angled surfaces of the wedge 80 and the angled surfaces of the channel 72.

Figure 3:
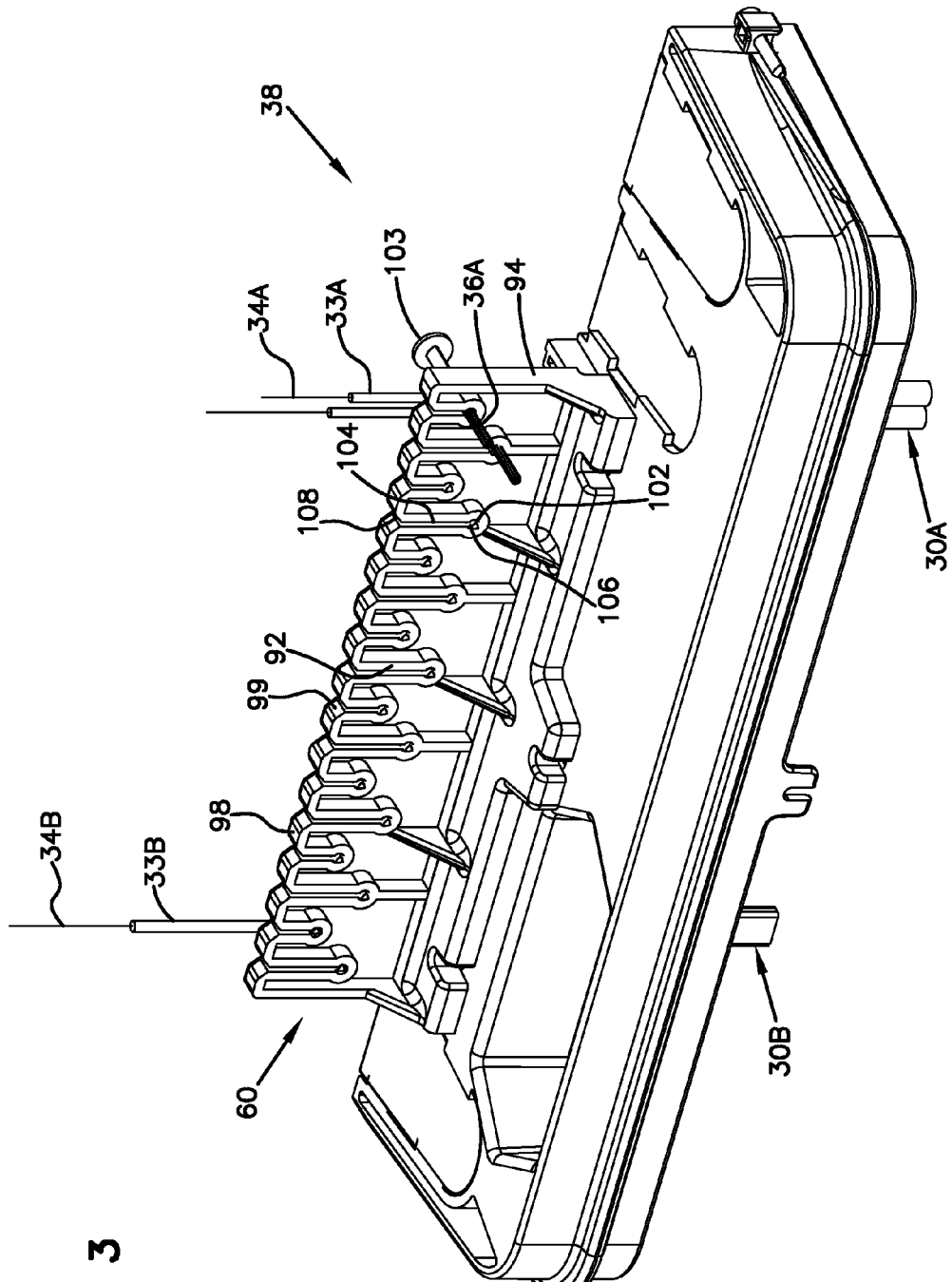
FIG. 3 is a back, top perspective view of the fiber optic cable anchoring assembly of FIG. 2.
Figure 4:
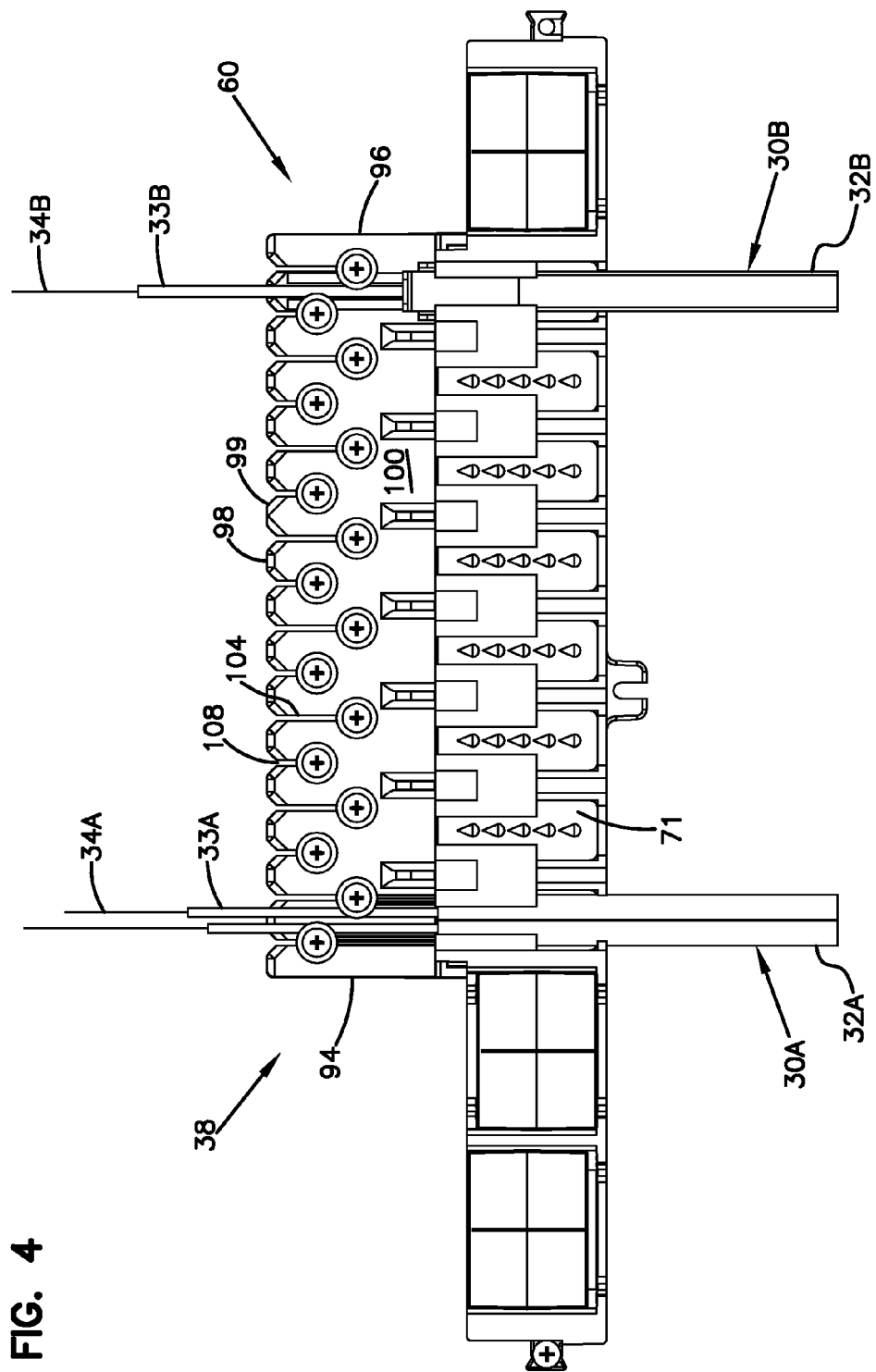
FIG. 4 is a front view of the fiber optic cable anchoring assembly of FIG. 2.
Figure 5:
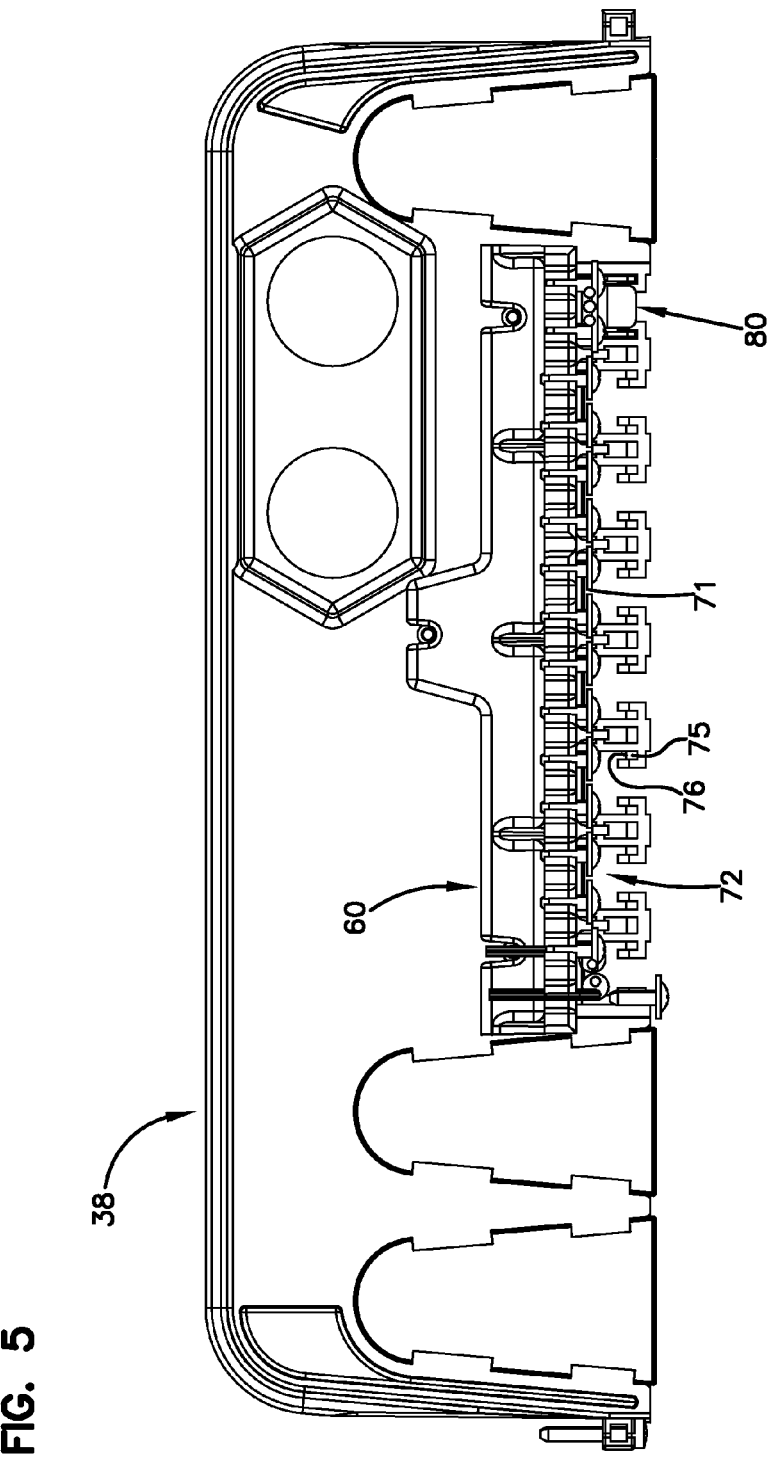
FIG. 5 is a top view of the fiber optic cable anchoring assembly of FIG. 2.
Figure 6:
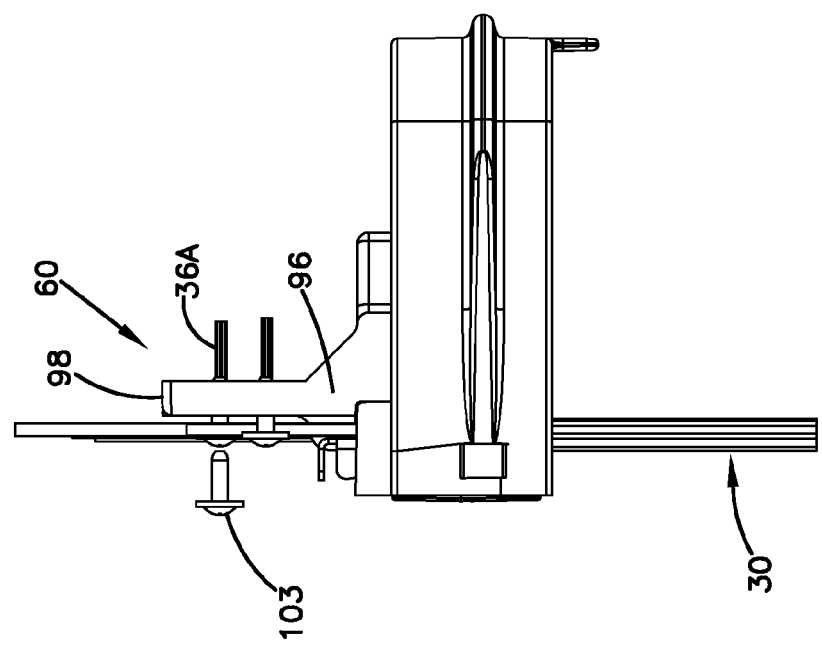
FIG. 6 is a side view of the fiber optic cable anchoring assembly of FIG. 2.
Figure 7:
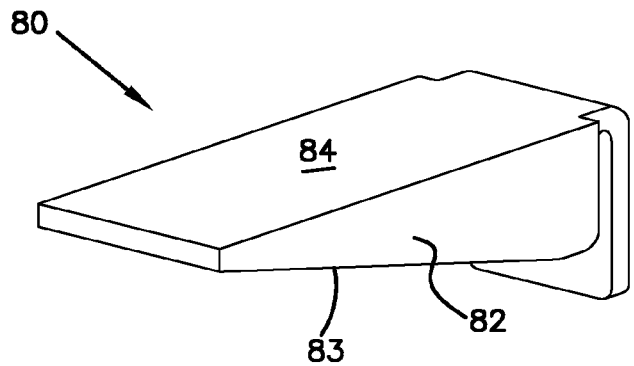
FIG. 7 is a perspective view of a wedge suitable for use with the fiber optic cable anchoring assembly.
Figure 8:
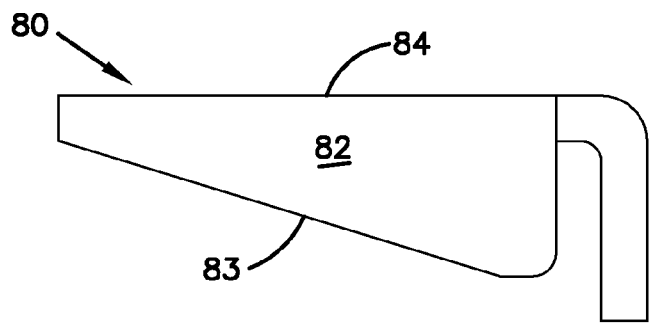
FIG. 8 is a side view of the wedge of FIG. 7.
Figure 9:
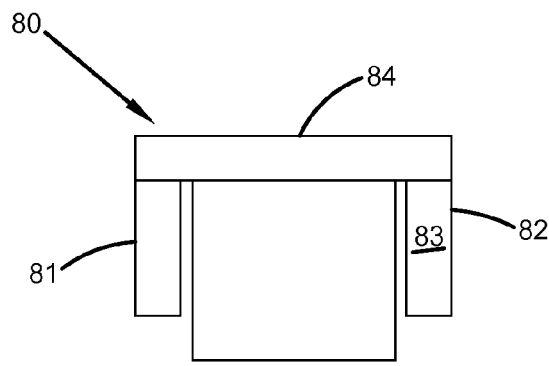
FIG. 9 is an end view of the wedge of FIG. 7.
Figure 10:
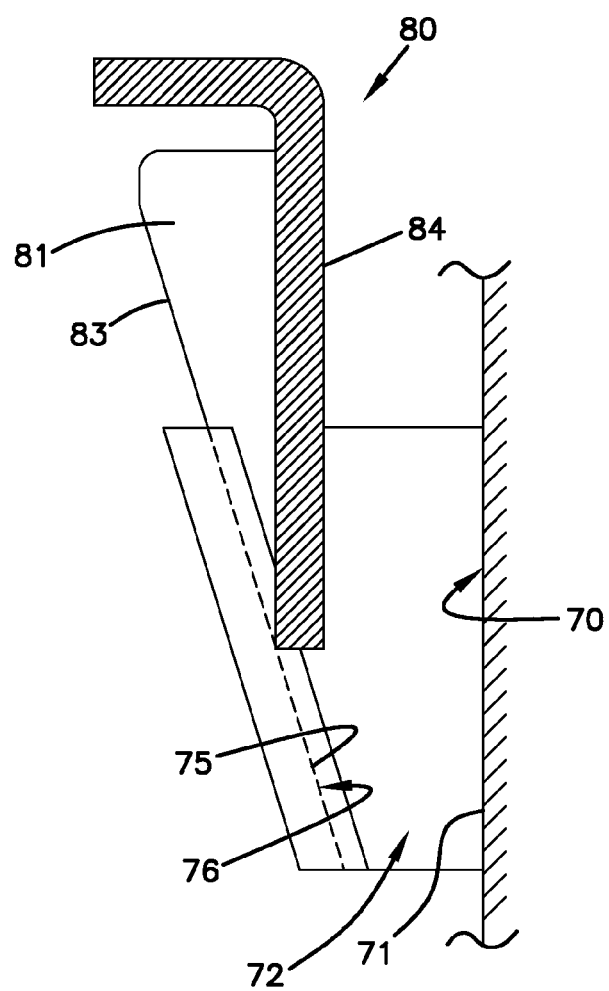
FIG. 10 is a fragmentary cross-sectional view of the wedge inserted into a channel of the fiber optic cable anchoring assembly.

Referring now to FIGS. 2-6, the reinforcing structure anchoring block 60 includes a first surface 90 and an oppositely disposed second surface 92 (shown in FIG. 3). In the depicted embodiment, the first surface 90 is a front surface while the second surface 92 is a back surface. The reinforcing structure anchor block 60 further includes a first end 94, an oppositely disposed second end 96 and a first side 98. The first and second ends 94, 96 extend between the first and second surfaces 90, 92 while the first side 98 extends between the first and second ends 94, 96. The first side 98 defines a plurality of notches 99. In the depicted embodiment, the notches 99 are generally V-shaped.

The reinforcing structure anchor block 60 further includes a plurality of reinforcing structure anchoring locations 100 that align generally with the jacket clamping locations 70. In the depicted embodiment, the reinforcing structure anchoring locations 100 are disposed on the first surface 90. Each of the reinforcing structure anchoring locations 100 defines a plurality of fastener openings 102, each of which is configured to receive a fastener 103. In the subject embodiment, each of the reinforcing structure anchor locations 100 defines two fastener openings 102. In a preferred embodiment, the fasteners 103 are threaded fasteners (e.g., screws, bolts or other threaded fasteners) that can be threaded into the fastener openings 102.

The reinforcing structure anchoring locations 100 also include access slots 104 that provide radial access to the fastener openings 102. Each of the access slots 104 includes a first open end 106 and an oppositely dispose second open end 108. The first open ends 106 are positioned at the fastener openings 102 and provide a path between the access slots 104 and the fastener openings 102. The access slots 104 extend radially outwardly from center axes of the fastener openings 102 and have the second open ends 108 disposed at a periphery of the reinforcing structure anchor block 60 so that the second open ends 108 are offset from the fastener openings 102. In the depicted embodiment, the second open ends 108 are disposed at the first side 98 of the reinforcing structure anchor block 60 so that the second open ends 108 provide a path between the access slots 104 and the notches 99 in the first side 98.

The access slots 104 have widths less than diameters of the fastener openings 102. Each of the access slots 104 provides an open lateral passage that allows the flexible reinforcing structure 36A of the fiber optic cable 30A to be inserted generally radially into the fastener opening 102 rather than requiring the reinforcing structure 36A to be threaded axially through the fastener opening 102. The term "generally radially" includes a pure radial direction as well as a direction merely having a radial spatial component relative to the central axis of the fastener opening 102.

The reinforcing structure anchoring locations 100 are configured to accommodate different styles of reinforcing structures. For example, each reinforcing structure anchoring location 100 can be used to anchor flexible reinforcing structures 36A or anti-buckling reinforcing structures 36B. As shown in FIG. 2, the anti-buckling reinforcing structures 36B are anchored to the reinforcing structure anchoring block 60 by passing the anti-buckling reinforcing structures 36B between heads of the fasteners 103 and the first surface 90 of the reinforcing structure anchoring block 60. By threading the fasteners 103 into the fastener openings 102, the anti-buckling reinforcing structures 36B are clamped between the heads of the fasteners 103 and the first surface 90 of the reinforcing structure anchoring block 60. In this way, the anti-buckling reinforcing structures 36B are effectively secured, attached or otherwise anchored to the reinforcing structure anchoring block 60.

The reinforcing structure anchoring locations 100 are also configured to readily accommodate the flexible reinforcing structures 36A. To secure one of the flexible reinforcing structures 36A to the reinforcing structure anchoring block 60, the flexible reinforcing structure 36A is routed upwardly from the jacket clamping location 70 to the open upper end of the corresponding access slot 104. The flexible reinforcing structure 36A is then moved downwardly in through the access slot 104 to the fastener opening 102. As the flexible reinforcing structure 36A is moved downwardly along the access slot 104, the flexible reinforcing structure 36A is bent at an angle (e.g., approximately a 90 degree angle) relative to an axis defined by the portion of the fiber optic cable 30 clamped at the jacket anchoring block 62. Once the flexible reinforcing structure 36A has been slid down the access slot 104 into the fastener opening 102, the fastener 103 can be threaded into the fastener opening 102. As the fastener 103 is threaded into the fastener opening 102, the flexible reinforcing structure 36 is effectively anchored within the fastener opening 102. Anchoring of the flexible reinforcing structure 36A can be caused by clamping the flexible reinforcing structure 36A between the threads of the fastener 103 and the wall defining the fastener opening 102. Securement of the flexible reinforcing structure 36A within the fastener opening 102 can also be enhanced by wrapping of the flexible reinforcing structure 36A about the fastener 103 as the fastener 103 is threaded into the fastener opening 102.

It will be appreciated that the configuration of the fastener opening 102 with the access slot 104 allows the reinforcing structures 36A to be quickly generally radially inserted into the fastener openings 102 without requiring the flexible reinforcing structures 36A to be axially threaded through the fastener openings 102. Moreover, prewrapping of the reinforcing structure 36A about the fasteners 103 is not required since any wrapping necessary for securement of the reinforcing structures 36A within the fastener openings 102 will occur automatically as the fasteners 103 are threaded within the fastener openings 102. In certain embodiments, the threads of the fastener 103 are able to retain the reinforcing structure 36A within the fastener opening 102 without requiring the reinforcing structure 36A to be wrapped about the fastener 103.

Figure 11:
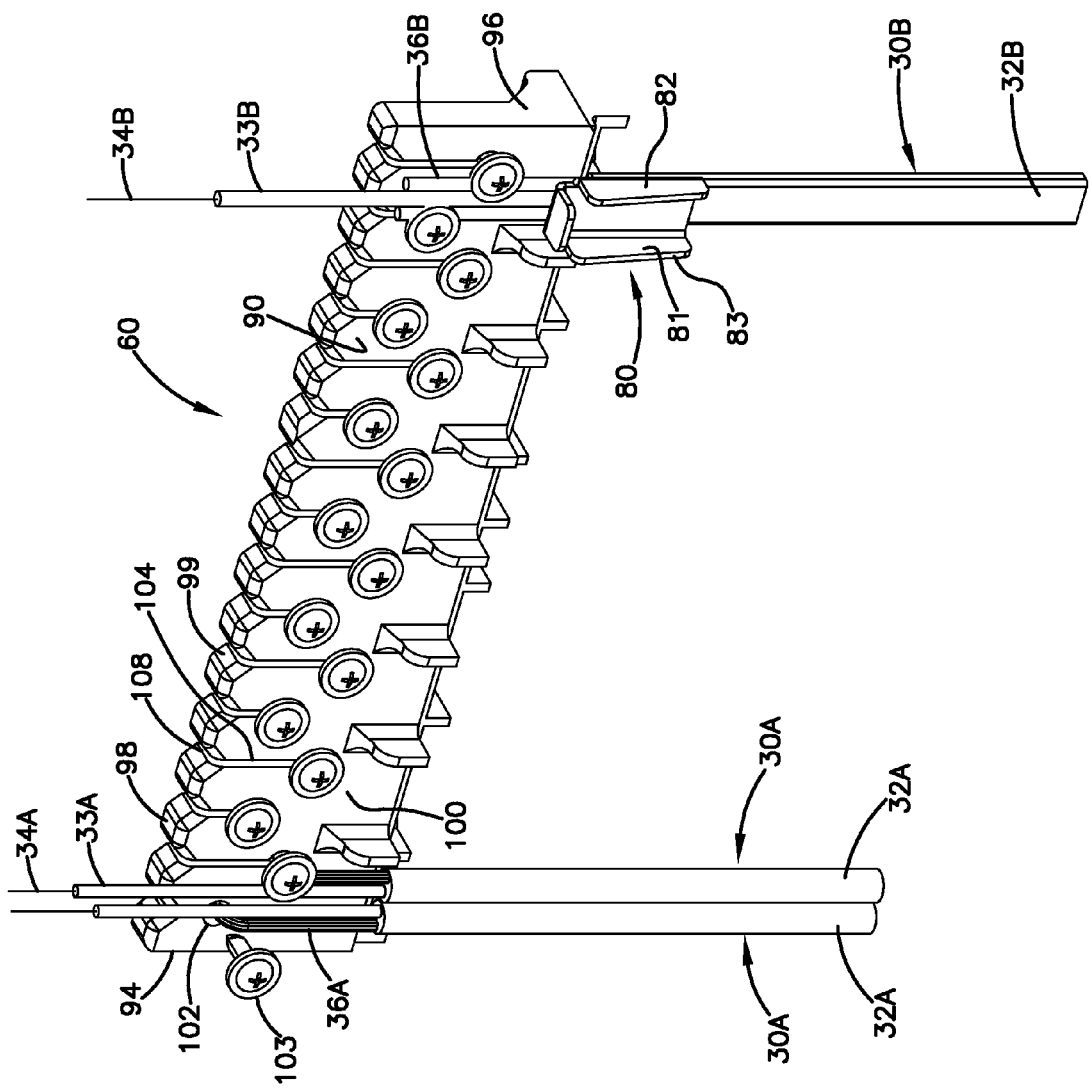
FIG. 11 is a front, top perspective view of a portion of the fiber optic cable anchoring assembly of FIG. 2.
Figure 12:
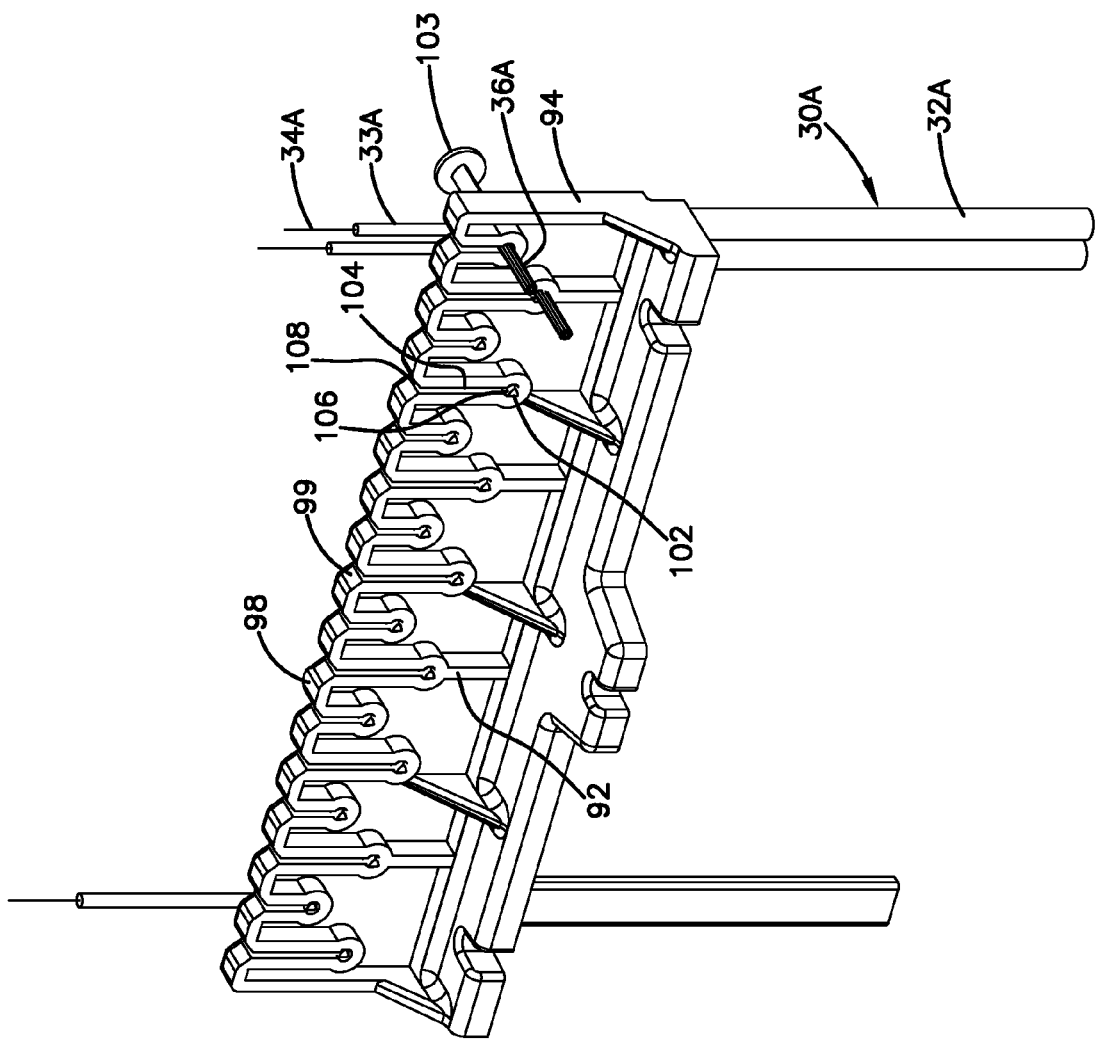
FIG. 12 is a back, top perspective view of a portion of the fiber optic cable anchoring assembly of FIG. 2.

Referring now to FIGS. 11 and 12, after the flexible reinforcing structures 36A have been routed laterally through the access slots 104 into the fastener openings 102, the flexible reinforcing structures 36A extend completely through the fastener openings 102 along axis of the fastener openings. The axis of the fastener openings 102 are aligned at angles relative to the beds 71 of the channels 72 provided at the jacket clamping locations 70. Thus, when the cables are secured at the cable anchoring assembly 38, the portions of the cables clamped at the jacket clamping location 70 are aligned at an angle relative to the portions of the reinforcing structures 36A secured within the fastener openings 102.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A cable anchoring assembly comprising:
    a jacket anchoring block having a jacket clamping location; and
    a reinforcing structure anchoring block mounted to the jacket anchoring block, the reinforcing structure anchoring block including:
        a reinforcing structure anchoring location, the reinforcing structure anchoring location defining a fastener opening and an access slot that extends outwardly from the fastener opening, the access slot having a first open end positioned at the fastener opening and a second open end offset from the fastener opening, wherein the access slot provides an open lateral passage into the fastener opening; and
        a fastener adapted for engagement in the fastener opening.

2. The cable anchoring assembly of claim 1, wherein a width of the access slot is less than a diameter of the fastener opening.

3. The cable anchoring assembly of claim 1, wherein the reinforcing structure anchoring block includes a plurality of the reinforcing structure anchoring locations, each of the reinforcing structure anchoring locations defining a plurality of the fastener openings and a plurality of the access slots.

4. The cable anchoring assembly of claim 1, wherein the jacket clamping location defines a channel that is adapted to receive a fiber optic cable.

5. The cable anchoring assembly of claim 4, wherein the jacket clamping location includes slots having ramp surfaces that angle toward a bed of the channel.

6. The cable anchoring assembly of claim 5, wherein the jacket anchoring block includes a wedge that cooperates with the channel to clamp the fiber optic cable in the channel.

7. The cable anchoring assembly of claim 6, wherein the wedge includes flanges that are adapted to engage the slots in the jacket clamping location, the flanges having angled end surfaces.

8. The cable anchoring assembly of claim 7, wherein the angled end surfaces of the flanges of the wedge define angles that are about equal to angles of the ramp surfaces of the slots.

9. A fiber optic enclosure comprising:
    a main housing body defining an interior region;
    a cable anchoring assembly secured to the main housing body, the cable anchoring assembly including:
        a jacket anchoring block having a jacket clamping location; and
        a reinforcing structure anchoring block mounted to the jacket anchoring block, the reinforcing structure anchoring block including:
            a reinforcing structure anchoring location, the reinforcing structure anchoring location defining a fastener opening and an access slot that extends outwardly from the fastener opening, the access slot having a first open end positioned at the fastener opening and a second open end offset from the fastener opening, wherein the access slot provides an open lateral passage into the fastener opening; and
            a fastener adapted for engagement in the fastener opening; and
    a first fiber optic cable routed into the interior region of the main housing body, the first fiber optic cable including at least one optical fiber, a reinforcing structure that extends a length of the first fiber optic cable, and an outer jacket that surrounds the optical fiber, wherein the outer jacket of the first fiber optic cable is secured to the jacket anchoring block and the reinforcing structure is secured to the reinforcing structure anchoring block.

10. The fiber optic enclosure of claim 9, wherein the reinforcing structure of the first fiber optic cable is a flexible strength member.

11. The fiber optic enclosure of claim 10, wherein the reinforcing structure is passed through the access slot into the fastener opening where the reinforcing structure is anchored by the fastener.

12. The fiber optic enclosure of claim 9, wherein the reinforcing structure of the first fiber optic cable is a reinforcing rod.

13. The fiber optic enclosure of claim 12, wherein the reinforcing structure is captured between a head of the fastener and a front side of the reinforcing structure anchoring block.

14. The fiber optic enclosure of claim 9, wherein a width of the access slot is less than a diameter of the fastener opening.

15. A method for securing a fiber optic cable to a fiber optic enclosure, the method comprising:
    removing a portion of an outer jacket from an end of a fiber optic cable so that a reinforcing structure of the fiber optic cable and an optical fiber of the fiber optic cable are exposed;
    routing the end of the fiber optic cable through a channel of a jacket anchoring block of a cable anchoring assembly that is disposed in an interior region of a fiber optic enclosure;
    securing the outer jacket of the fiber optic cable to the jacket anchoring block;
    routing the reinforcing structure laterally through an access slot in a reinforcing structure anchor block and into a fastener opening in the reinforcing structure anchor block; and
    securing the reinforcing structure of the fiber optic cable to the reinforcing structure anchor block by engaging a fastener in the fastener opening.

16. The method of claim 15, wherein the outer jacket of the fiber optic cable is secured to the jacket anchoring block by a wedge that is inserted into the channel.

17. The method of claim 16, wherein the channel includes slots having ramp surfaces that angle toward a bed of the channel.

18. The method of claim 17, wherein the outer jacket of the fiber optic cable is secured between a clamping surface of the wedge and the bed of the channel.

19. The method of claim 15, wherein the reinforcing structure is aramid yarn.

20. The method of claim 15, wherein the reinforcing structure anchor block is mounted to the jacket anchoring block.

* * * * *